United States Patent [19] [11] 4,454,676

Humble [45] Jun. 19, 1984

[54] LINEGUIDE ASSEMBLY

[75] Inventor: Raymond Humble, Alnwick, England

[73] Assignee: Hardy Brothers (Alnwick) Limited, Alnwick, England

[21] Appl. No.: 248,506

[22] Filed: Mar. 27, 1981

[30] Foreign Application Priority Data

Apr. 30, 1980 [GB] United Kingdom ................. 8014164

[51] Int. Cl.[3] ............................................. A01K 87/04

[52] U.S. Cl. .................................... 43/24; 242/157 R

[58] Field of Search ........................ 43/24; 242/157 R

[56] References Cited

U.S. PATENT DOCUMENTS

| | | | |
|---|---|---|---|
| 2,596,835 | 5/1952 | Benge | 43/24 |
| 2,619,714 | 12/1952 | Dornaus | 43/24 |
| 2,893,158 | 7/1959 | Haber | 43/24 |
| 4,030,224 | 6/1977 | Dorph | 43/24 |
| 4,070,785 | 1/1978 | Hawk | 43/24 |

FOREIGN PATENT DOCUMENTS

| | | | |
|---|---|---|---|
| 876014 | of 1953 | Fed. Rep. of Germany | 43/24 |
| 922381 | 1/1955 | Fed. Rep. of Germany | 43/24 |
| 1218143 | 1/1971 | United Kingdom | 43/24 |

*Primary Examiner*—Nicholas P. Godici
*Assistant Examiner*—M. Jordan
*Attorney, Agent, or Firm*—McCormick, Paulding & Huber

[57] ABSTRACT

A lineguide includes two longitudinally slotted sleeves 18 which fit on a fishing rod. These sleeves have apertures 16 and 22 extending transversely through them. The aperture 16 is circular and the aperture 22 is a slot extending parallel to the longitudinal axis of the sleeve 18. A line housing 20 has two leg mountings 24 each having two transversely spaced limbs to straddle the apertures 16 and 22. The leg mountings 24 are pivotally mounted in their respective apertures by pivot pins 26. When the rod flexes one pivot pin 26 moves along its slot 22 taking up the change in spacing between the sleeves 18 and thereby reducing any stiffness in the rod 8 between the sleeves 18.

11 Claims, 10 Drawing Figures

4
2
6
6
8
10
10

4

17
12
16
8
14

4
17
15

15
12
16
14

15
16
12

20
24
24
26
22
18
18

LINEGUIDE ASSEMBLY

TECHNICAL FIELD

The present invention relates to a lineguide for a fishing rod. Lineguides are attached at spaced longitudinal intervals to a fishing rod in order to retain the fishing line in close proximity to the rod between the line reel and the rod tip. Each lineguide has an aperture therein through which the line can pass freely to enable the line to be readily cast or wound in.

BACKGROUND ART

A conventional lineguide includes an annular housing to receive the fishing line; this housing being connected by two legs to respective feet which are secured to longitudinally spaced parts of the fishing rod. Normally the feet are wrapped to the rod with a suitable binding thread. In operation, the rod is required to flex thereby causing an alteration in the relative positions of the rod parts supporting the lineguide feet. Previously proposed lineguides depend on the resilience of their material to enable the lineguide feet to move with their corresponding rod parts during flexing of the rod. Due to insufficient flexibility of known lineguides. difficulties can arise in that a lineguide may prevent the rod from flexing sufficiently in the region of the lineguide feet, and may cause the lineguide feet to pull out from their wrapping.

It is an aim of the invention to alleviate the aforementioned difficulty, and the invention envisages a lineguide adapted for pivotal movement with respect to a fishing rod on which it is mounted.

FIGURES IN THE DRAWINGS

Embodiments of the invention will now be described by way of example with reference to the accompanying illustrative drawings in which.

DETAILED DESCRIPTION OF DRAWINGS

Figure 1:
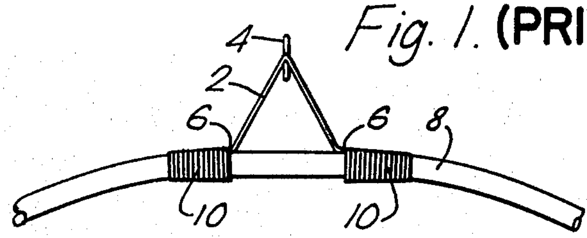
FIG. 1 is a side elevation of a known lineguide mounted on a fishing rod.

Referring to FIG. 1, a known lineguide includes two legs 2 diverging from an annular line housing 4, and having feet 6 at their other end. The legs 2 and feet 6 are constructed of wire, and the feet 6 are colinear and extend in opposite directions to one another. The feet 6 are bound to a fishing rod 8 by nylon thread 10.

When the fishing rod 8 flexes during operation the relative spacing of the fishing rod parts supporting the lineguide feet 6 will alter. The ability of the lineguide feet 6 to move with the corresponding parts of the rod 8 will depend on the resilience of the material of the lineguide legs 2 and feet 6. If the feet 6 cannot follow the movement of their respective parts of the rod 8, then the region of the rod 8 supporting the lineguide will be stiffer than the other part of the rod 8. In addition, there will be a tendency for the feet 6 to pull out from the wrapping thread 10 thereby detaching the lineguide from the rod 8.

Referring to FIGS. 2 to 5, one lineguide of the invention includes a line housing 4 similar to the line housing of FIG. 1. Two sleeves 12 each have an annular end tag 14 with a solid portion 15 having an aperture 16 extending therethrough. Each sleeve 12 is longitudinally slotted so that the sleeve can be opened out and located on the fishing rod 8. To assemble the lineguide, the sleeves 12 are located on the rod 8 and spaced so that the apertures 16 are at the normal spacing of the lineguide feet when the rod 8 is unflexed. The sleeves 12 are then bound tightly with nylon thread 10 to secure the sleeves 12 to the rod 8. Each lineguide includes a wire support 17 which extends forwardly and rearwardly from the line housing 4 to pass through both apertures 16 and return to and be secured to the line housing 4. The wire support 17 and apertures 16 are dimensioned so that the support 17 can pivot in its respective apertures. This pivotal mounting of the lineguide enables the lineguide to adjust to the change in spacing and angle of the tags 14 when the rod 8 flexes. In addition, this pivotal mounting ensures that the lineguide support 17 cannot pull out from the sleeves 12 when the rod flexes.

Figure 2:
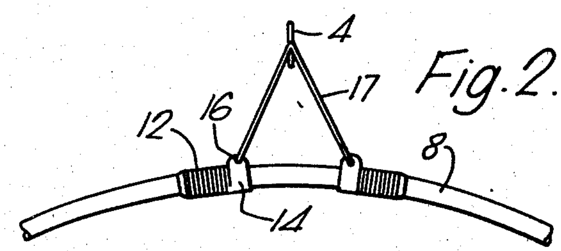
FIG. 2 is a side elevation of one lineguide of the invention mounted on a fishing rod.
Figure 5:
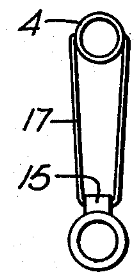
FIG. 5 is an end view of the lineguide of FIG. 2.

Referring to FIGS. 6 to 9, another lineguide of the invention includes two longitudinally slotted sleeves 18 and a line housing 20 which is larger and more rigid than the lineguide of FIG. 2. Each sleeve 18 is similar to the sleeve 12 of FIGS. 2 to 5 except that one sleeve i.e. the left-hand sleeve of FIG. 6 and the right-hand sleeve of FIG. 7 has an elongate slot 22 extending parallel to the longitudinal axis of the sleeve 18. The other sleeve 18 i.e. the right-hand sleeve in FIG. 6 and the left-hand sleeve in FIG. 7 has an aperture 16 the same as the sleeves 12 illustrated in FIG. 2. The line housing 20 is shaped to include two leg mountings 24 each having two transversely spaced limbs to straddle the tag portion 15. The leg mountings 24 are pivotally mounted in their respective aperture 16 and slot 22 by pivot pins 26.

When the rod 8 flexes the left-hand pivot pin 26 moves along its slot 22 thereby taking up the change in spacing between the tags 14 and reducing any stiffness in the portion of the rod 8 between these tags 14.

Figure 3:
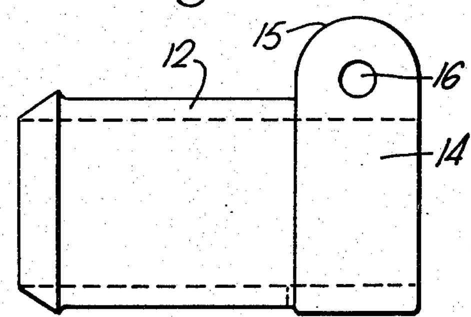
FIG. 3 is a side elevation of part of the lineguide of FIG. 2.
Figure 4:
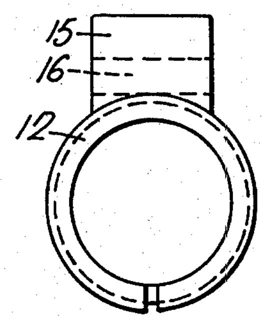
FIG. 4 is an end view of the part of FIG. 3.
Figure 6:
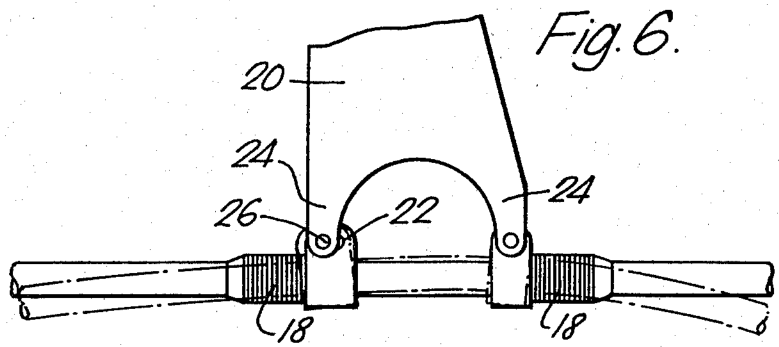
FIG. 6 is a side elevation of part of another lineguide of the invention mounted on a fishing rod.
Figure 7:
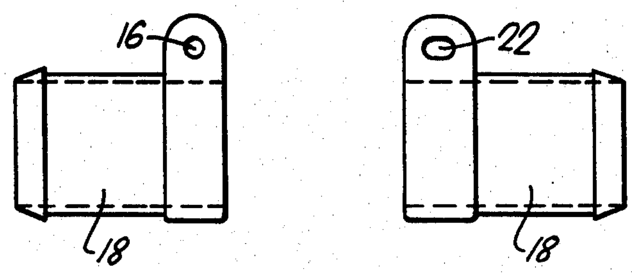
FIG. 7 is a side elevation of a part of the lineguide of FIG. 6.
Figure 8:
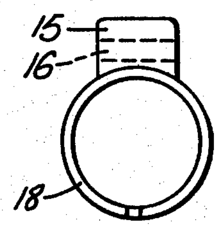
FIGS. 8 and 9 are end and plan views respectively of the part of FIG. 7.
Figure 9:
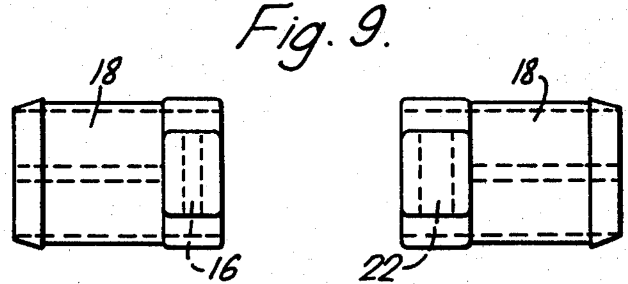
Figure 10:
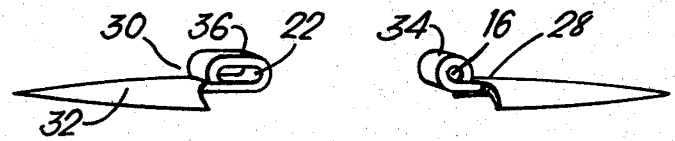
FIG. 10 is a perspective view of part of a further lineguide of the invention.

The lineguide illustrated in FIGS. 2 and 3 have included sleeves 12 with associated tags 14. The invention includes a lineguide in which these sleeves are replaced by mounting plates 28 and 30 illustrated in FIG. 10 Each mounting plate includes an elongate base 32 transversely curved to sit on the rod 8 and to be bound thereon by nylon thread. The mounting plate 28 also includes an eyelet 34 having a circular aperture 16 extending therethrough. The mounting plate 30 includes an eyelet 36 having an elongate slot 22 extending therethrough; this slot 22 being elongate in the longitudinal direction of the mounting plate 30. To assemble the lineguide the leg mountings 24 and the mounting plates 28 and 30 are positioned together so that the pivot pins 26 can be inserted through one limb of their respective leg mountings 24. These pivot pins are then inserted through their respective eyelets 34 and 36 and through the other limb of their respective leg mountings 24. The pivot pins 26 are then rivetted at their free ends in order to retain them in position. The assembly is then placed on the rod 8 and the bases 32 are bound to the rod 8 with nylon or other thread. Although the mounting plates 28 and 30 have been described in combination with the lineguide of FIG. 6, it is to be understood that these mounting plates 28 and 30 could be used with the lineguide of FIG. 2 or in fact any suitable lineguide.

I claim:

1. A lineguide comprising two mounting sleeves for assembly with a fishing rod at longitudinally spaced portions of the rod, each sleeve being longitudinally slotted, and a line housing defining an opening for the fishing line, said line housing having spaced feet, said feet pivotally connected to the sleeve mountings for pivotal movement of said feet and of said line housing in the longitudinal direction of the rod.

2. A lineguide as claimed in claim 1, in which each sleeve has an aperture of circular cross-section extending transversely therethrough.

3. A lineguide as claimed in claim 2, including a wire support extending from the line housing and passing through said apertures.

4. A lineguide comprising two mountings adapted to be located on longitudinally spaced portions of a fishing rod, and a line housing connected to the mountings for pivotal movement in the longitudinal direction of the rod, and in which each mounting has an aperture extending transversely therethrough, one aperture being of circular cross-section, and the other aperture cross-section being elongate in the longitudinal direction of the fishing rod.

5. A lineguide as claimed in claim 4, in which each mounting comprises a sleeve to receive the fishing rod.

6. A lineguide as claimed in claim 4, including two leg supports extending from the line housing, each leg support having two transversely spaced limbs to straddle an associated one of said apertures.

7. A lineguide as claimed in claim 4, in which each mounting includes an elongate base transversely curved to sit on the fishing rod.

8. A lineguide for a flexible fishing rod, and comprising two sleeve mountings adapted to be secured to longitudinally spaced locations on said rod and having apertures extending traversely therethrough, housing means defining an opening for a fishing line, said housing means pivotally connected to said apertures in said mounting sleeves, at least one aperture comprising a slot.

9. A lineguide as defined in claim 8 wherein said housing means comprises a formed wire support and an annular ferrule supported in spaced relation to said rod by said wire support.

10. A lineguide as defined in claim 8 wherein each of said sleeves is slotted along at least a portion of it's length.

11. A lineguide for a flexible fishing rod, and comprising two mounting plates adapted to be secured to longitudinally spaced locations on said rod, housing means defining an opening for a fishing line, said mounting plates defining eyelets for movably receiving said housing means, one of said two eyelets defines a pivotal connection with said housing means, and the other of said two eyelets being elongated in the longitudinal rod direction to allow pivotal and sliding movement of said housing means during flexing of the fishing rod.

* * * * *